United States Patent [19]

Fidric et al.

[11] Patent Number: 5,136,600
[45] Date of Patent: Aug. 4, 1992

[54] STABILIZATION APPARATUS AND METHOD FOR AN SFS

[75] Inventors: Bernard G. Fidric, Woodland Hills; David F. Libman, Moorpark, both of Calif.

[73] Assignee: Litton Systems Inc., Beverly Hills, Calif.

[21] Appl. No.: 585,712

[22] Filed: Sep. 18, 1990

[51] Int. Cl.⁵ .............................................. H01S 3/13
[52] U.S. Cl. ........................................ 372/32; 372/69; 372/6; 350/96.15; 385/15
[58] Field of Search ........................ 372/6, 69, 70; 350/96.15, 96.16, 96.29

[56] References Cited

U.S. PATENT DOCUMENTS

| | | | |
|---|---|---|---|
| 4,791,645 | 12/1988 | Komatsubatla | 372/5 |
| 4,938,556 | 7/1990 | Digonnet et al. | 372/69 |
| 4,964,131 | 10/1990 | Liu et al. | 372/6 |

Primary Examiner—LACE/e/ on Scott, Jr.
Attorney, Agent, or Firm—James F. Kirk

[57] ABSTRACT

A wavelength stabilization apparatus and method for a superfluorescent source comprising a SFS (superfluorescent source) comprising a fiber with a core doped with lzaing material. The SFS source produces SFS light with an SFS wavelength when pumped with pump light from a pump light source having a pump light wavelength. An output controller responds to a sample of the SFS light and operates to maximize the power of th esample of SFS light by automatically adjusting the pump light wavelength. The output controller also has a pump power controller responsive to a sample of the pump light from the pump light source for stabilizing the output power of the sample of the pump light with respect to a predetermined reference output power level.

18 Claims, 10 Drawing Sheets

STABILIZATION APPARATUS AND METHOD FOR AN SFS

BACKGROUND

1. Field of the Invention

This invention relates to the field of optics and more particularly to the field of light sources, also called amplified spontaneous emission (ASE) laser useful in applications such as interferometric sensors such as a fiber optic gyro.

2. Related Art

U.S. Pat. No. 4,637,025 for a "Super Radiant Light Source" issued Jan. 13, 1987 to E. Snitzer et al and described the use of a single mode optical fiber having a core doped with an active laser material such as neodymium. The fiber is pumped with pump light sufficient to produce amplification of spontaneous emissions. In one embodiment, a dichroic mirror is used to provide a double pass for light in the fiber core for extra gain. Snitzer does not show or suggest a control process for controlling the wavelength of the pump source light.

SUMMARY OF THE INVENTION

It is a first object of the invention to stabilize the output wavelength of a superfluorescent fiber source.

It is a second object of the invention to operate the superfluorescent source with maximum efficiency. The pump wavelength is automatically driven to a point to obtain the maximum efficiency of the super fluorescent source.

These objects and others are achieved in the invention wavelength stabilization apparatus and method for a superfluorescent source comprising a SFS (superfluorescent source) comprising a fiber with a core doped with lazing material. The SFS source produces SFS light with an SFS wavelength when pumped with pump light from a pump light source having a pump light wavelength. An output controller responds to a sample of the SFS light and operates to maximize the power of the sample of SFS light by automatically adjusting the pump light wavelength. The output controller also has a pump power controller responsive to a sample of the pump light from the pump light source for stabilizing the output power of the sample of the pump light with respect to a predetermined reference output power level.

Figure 12:
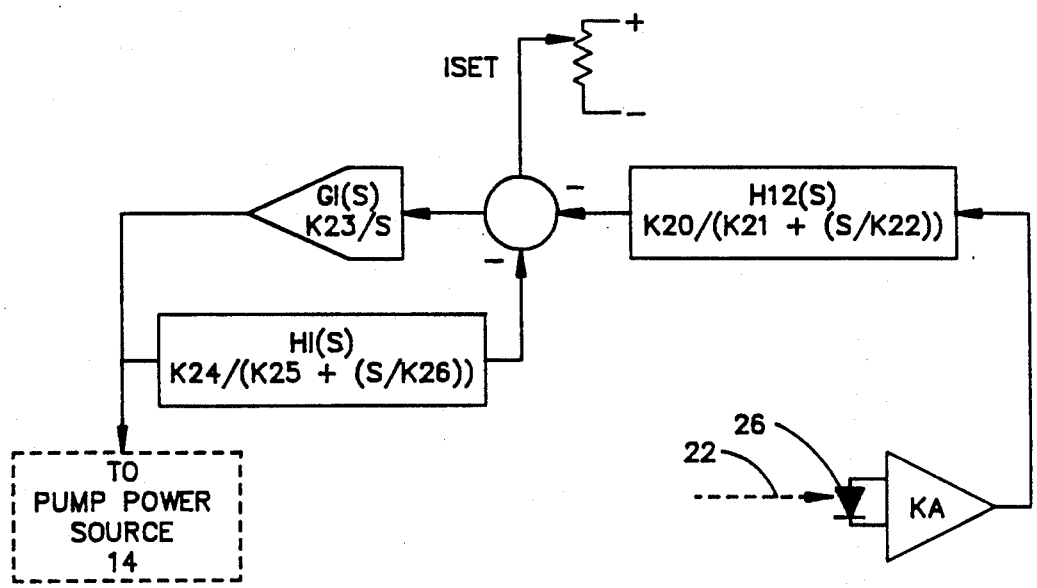
Figure 13:
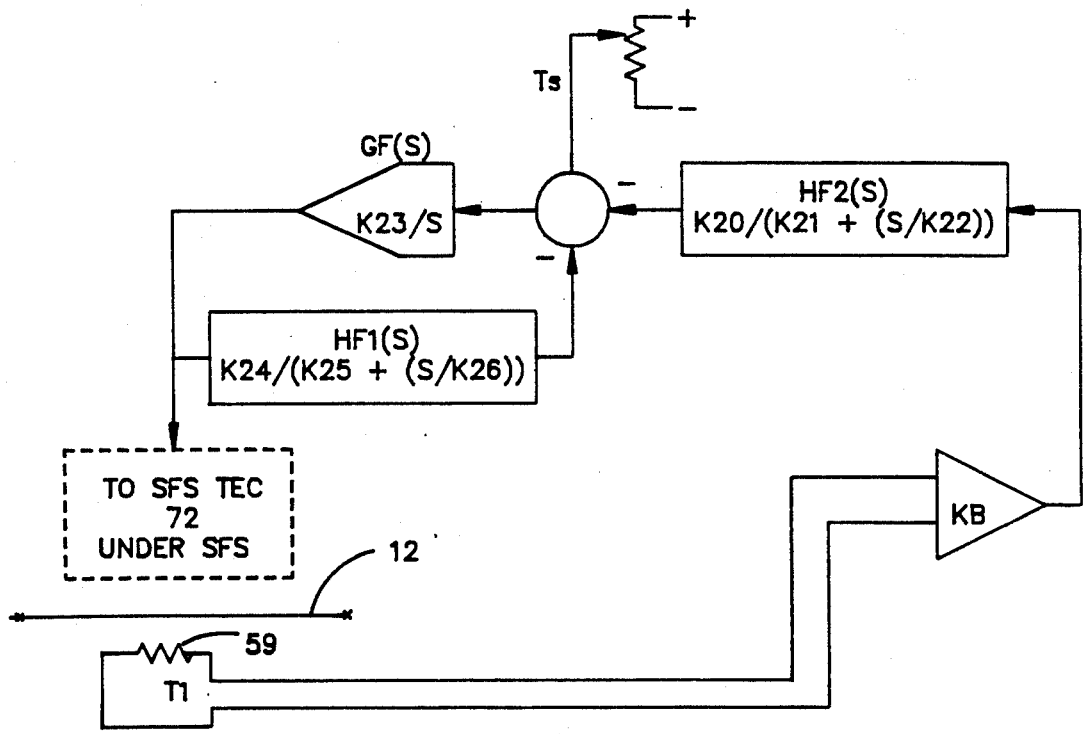

FIG. is a more detailed block diagram of an embodiment of the output controller for the control system for stabilizing the wavelength of a broadband super fluorescent light source (SFS);

FIG. 12 is a block diagram of an embodiment of the pump power controller for the control system for stabilizing the wavelength of a broadband super fluorescent light source (SFS);

FIG. 13 is a block diagram of an embodiment of a temperature controller for the SFS fiber source.

PREFERRED EMBODIMENT

Figure 1:
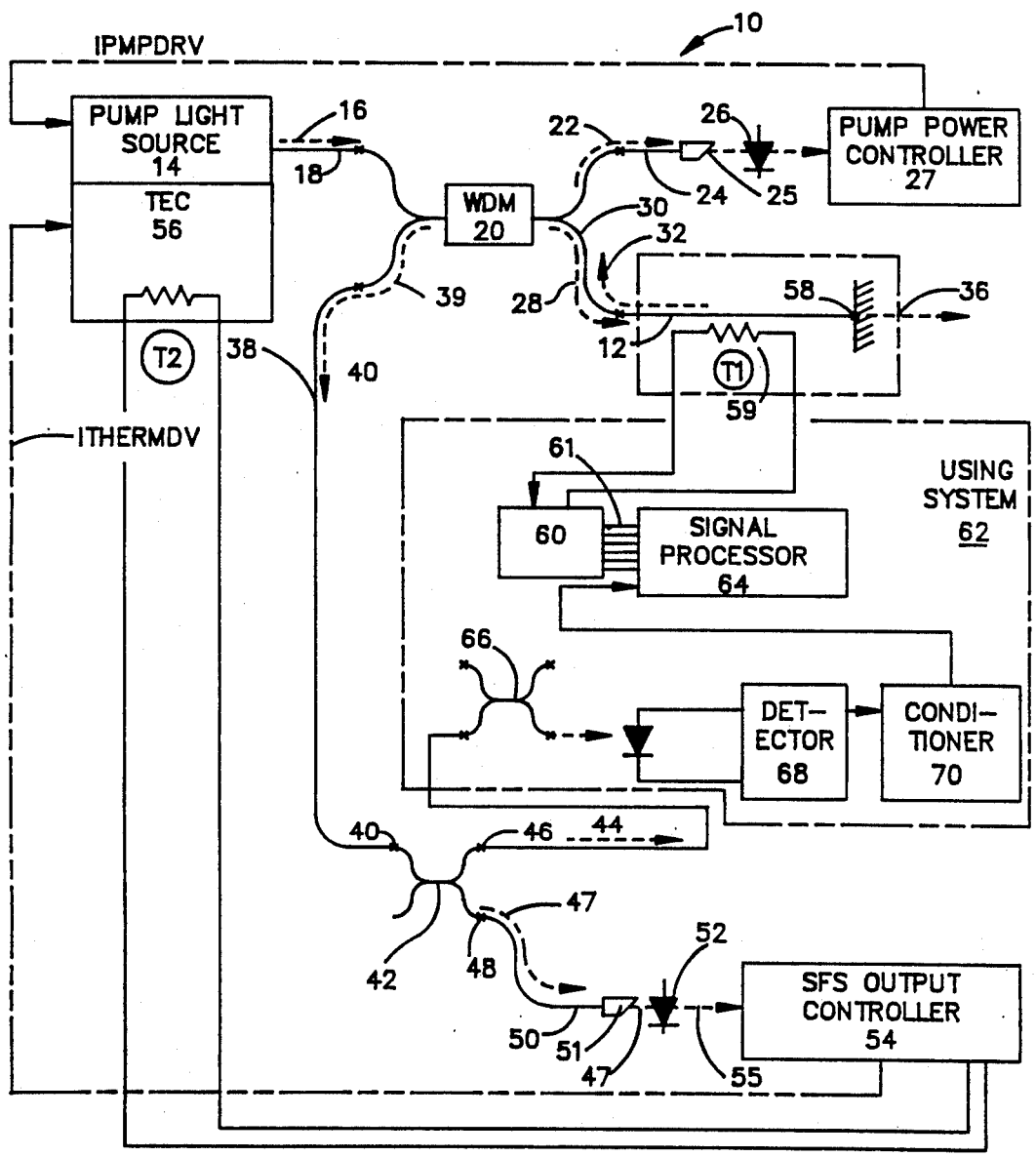
FIG. 1 is a block diagram of the control system for stabilizing the wavelength of a broadband super fluorescent light source (SFS)

FIG. 1 is a block diagram of a preferred embodiment of a system 10 for stabilizing the wavelength of a SFS fiber source 12. Pump light source 14 provides a pump light ray 16 at pump wavelength PMPLNTH and with pump power PMPPWR to the SFS (super fluorescent source) fiber 12 via a pump light optical path 18 to WDM (wavelength division multiplexer) 20.

"The WDM 20 splits the pump light ray 16 by a predetermined ratio and couples a first portion of the pump light ray 16, referred to as pump monitor light ray 22 with pump power Pp1, via a pump monitor fiber port 24, to pump monitor fiber port 25, to a pump monitor detector 26. Pump power controller 27 represents a pump power control means responsive to a pump detector signal from pump monitor detector 26 for adjusting the amplitudes of the pump drive current IPMDRV to maintain the pump monitor light ray 22 from pump monitor fiber port 25 at constant power. A second portion of pump light ray 16, referred to as main ray of pump light 28 with pump power Pp2 is coupled into the SFS fiber source 12 via optical path 30."

The SFS fiber source 12 contains a single mode optical fiber having a core doped with at least one active laser material such as neodymium or erbium. The SFS fiber is pumped the main ray of pump light 28 via optical path 30 with sufficient power Pp2 to produce amplification of spontaneous emission of the active laser material to provide an SFS emission ray 32 of light that exits the SFS fiber source 12 via SFS optical path 30.

A dichroic mirror 34 formed on the end surface of the SFS fiber source 12 reflects light at the wave-length of the SFS emission ray 32 to provide a double pass for SFS light in the SFS fiber source for extra gain. The dichroic mirror 34 is designed to pass a residual pump light ray 36 through the dichroic mirror 34 to avoid reflection of the unabsorbed portion of the main ray of pump light 28 back to the WDM 20. Use of the dichroic mirror 34 improves operation of the invention; however, the system will operate without it but with reduced efficiency.

The SFS emission ray 32 returns to the WDM 20 via SFS optical path 30 with an SFS emission power Ps and with the SFS emission wavelength Ls. The WDM 20 directs the SFS emission ray 32 via the WDM output path 38 as SFS output emission ray 39 to the coupler input 40 of coupler 42. Coupler 42 splits the SFS output emission ray 39 into an SFS output ray 44 at SFS system output 46 and into an SFS sense ray 47 output at SFS sense output 48. Coupler 42 is typically designed to provide over 90% of the power of the SFS output emission ray 39 to the SFS system output 44 and less than 10% of the power to the SFS sense output 48.

The SFS sense ray 47 is directed via SFS output fiber 50 through SFS output detector port 51 to SFS output detector 52. SFS output controller 54 represents a temperature control means responsive to an SFS output sense signal represented by phantom line 55 from SFS output detector 52 for adjusting the wavelength of the pump light ray 16 by adjusting the pump temperature Tp of the pump light source 14 to maximize the amplitude of the SFS sense ray 47 by adjusting the drive current ITHERMDV to a thermal electric cooler (TEC) 56.

Pump power controller 27 represents a pump power control means responsive to a pump detector signal from pump monitor detector for adjusting the amplitude of the pump drive current IPMDRV to maintain the pump monitor light ray 22 from pump monitor fiber port 25 at constant power.

OPERATION

Figure 2:
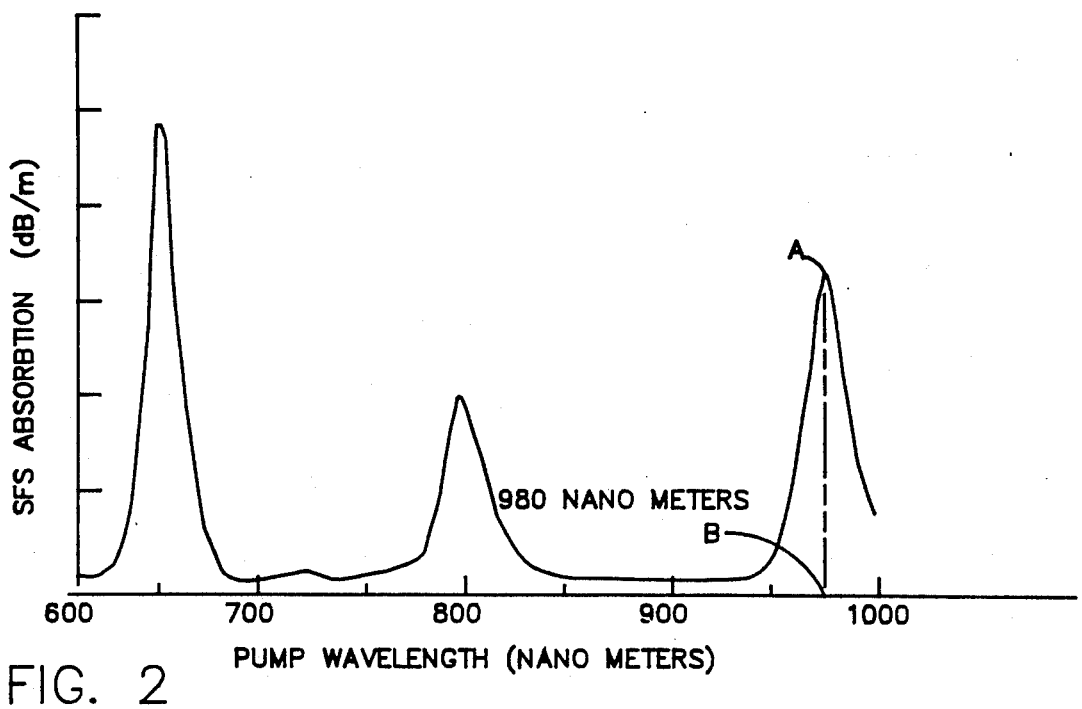
FIG. 2 is a graphical schematic representation of the pump absorption by the SFS fiber measured as the ratio of the residue pump power leaving the super fluorescent source fiber to the power into the SFS fiber as a function of the pump wavelength.

FIG. 2 is a graphical schematic representation of the pump absorption by the SFS fiber measured as the inverse ratio of the residual pump power in sense ray 57 leaving the super fluorescent source fiber via dichroic mirror 58 to the power delivered to the SFS fiber 12 by main ray of pump light 28 via SFS optical path as a function of the pump wavelength PMPLNTH of the pump light ray 16. The peak in the absorption of pump power at "A" was obtained using a sample of Erbium doped alumino-silicate fiber. The peak at "A" was observed to occur at approximately 980 nano meters as the pump wavelength PMPLNTH is swept from 900 nano meters to 1000 nano meters while holding the power in the pump monitor light ray 22 in FIG. 1 substantially constant.

A laser diode with a center wavelength at 980 nano meters was selected for use in the pump light source 14; however, in alternate embodiments, laser diodes with wavelengths centered at 810, 980 or 1475 nanometers can be used depending on the requirements of the particular embodiment. A model OL452A diode purchased from OKI in Japan was suitable for the application.

Figure 3:
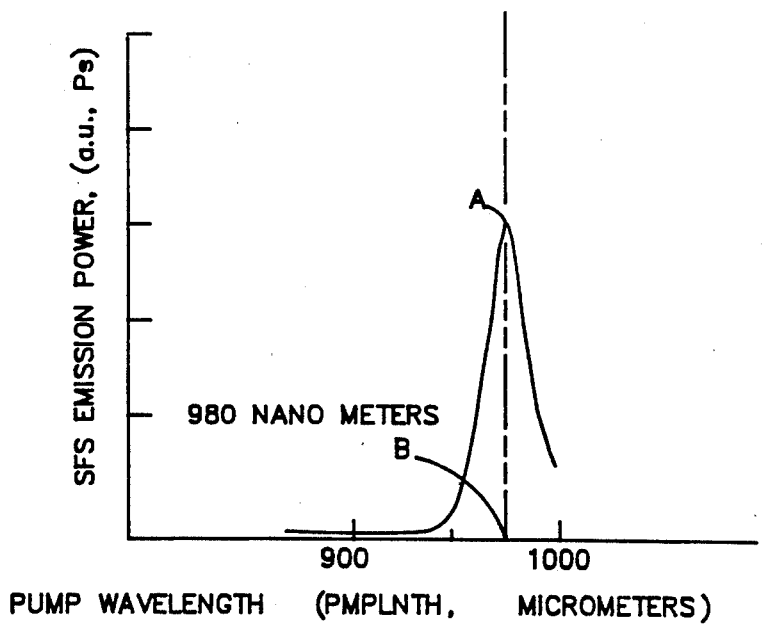
FIG. 3 is a graphical schematic representation of the SFS fiber emission power as a function of pump wavelength with pump power being held constant.

FIG. 3 is a graphical schematic representation of the SFS fiber emission power in SFS emission ray 32 as a function of pump wavelength with pump power being held constant. This graph shows that the peak output power of the SFS emission ray 32 to WDM 20 also coincides with a pump wavelength of 980 nanometers.

Figure 4A:
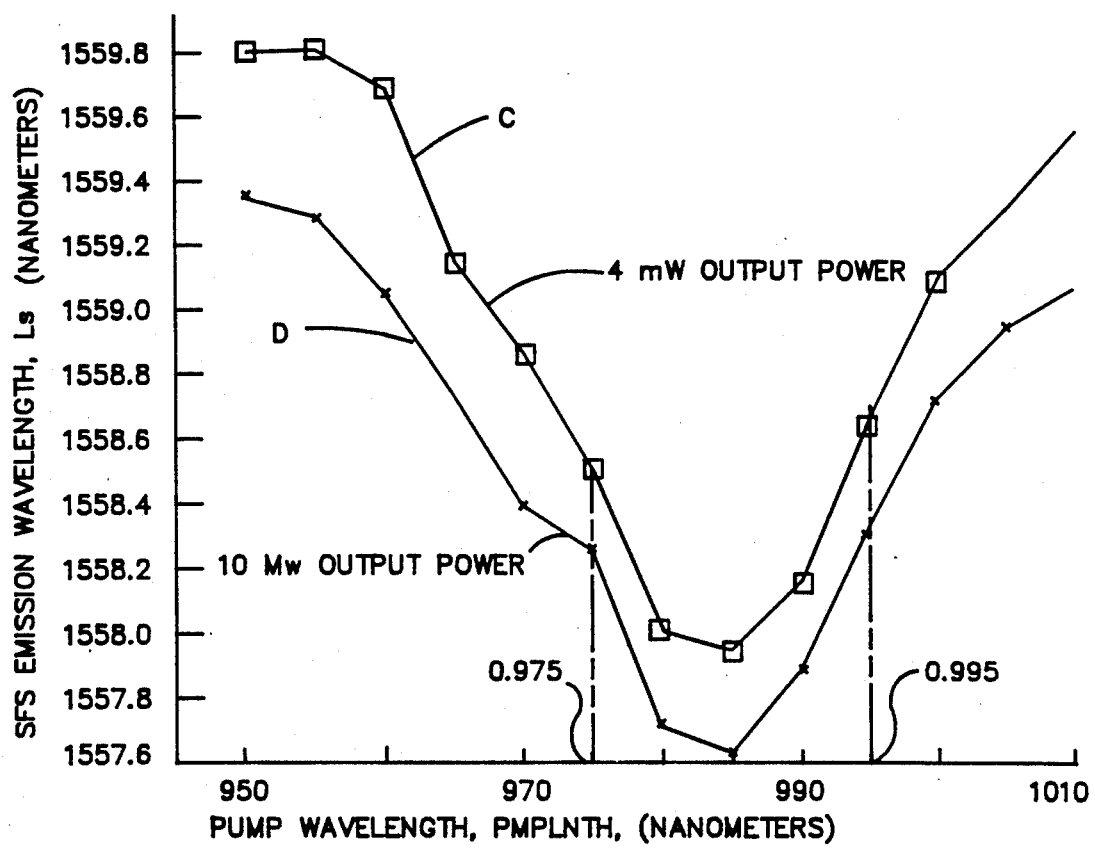
FIG. 4a is a graphical schematic representation of the SFS fiber emission wavelength as a function of pump wavelength with pump power held constant at a first and second level.

FIG. 4a is a graphical schematic representation of data that shows that the SFS fiber emission wavelength Ls of the SFS emission ray 32 varies as a function of the pump light ray 16 pump light wavelength PMPLNTH. Variation of the SFS fiber emission wavelength Ls as a function of pump wavelength is shown with the SFS emission power held constant at a first level of 4 mW and second level of 10 Mw.

FIG. 4a shows that the stability of the SFS wavelength is greatest where the change in SFS wavelength with respect to a change in the pump wavelength is least. The point of greatest stability also occurs when the pump wavelength PMPLNTH is at or near 980 nano meters.

Figure 4B:
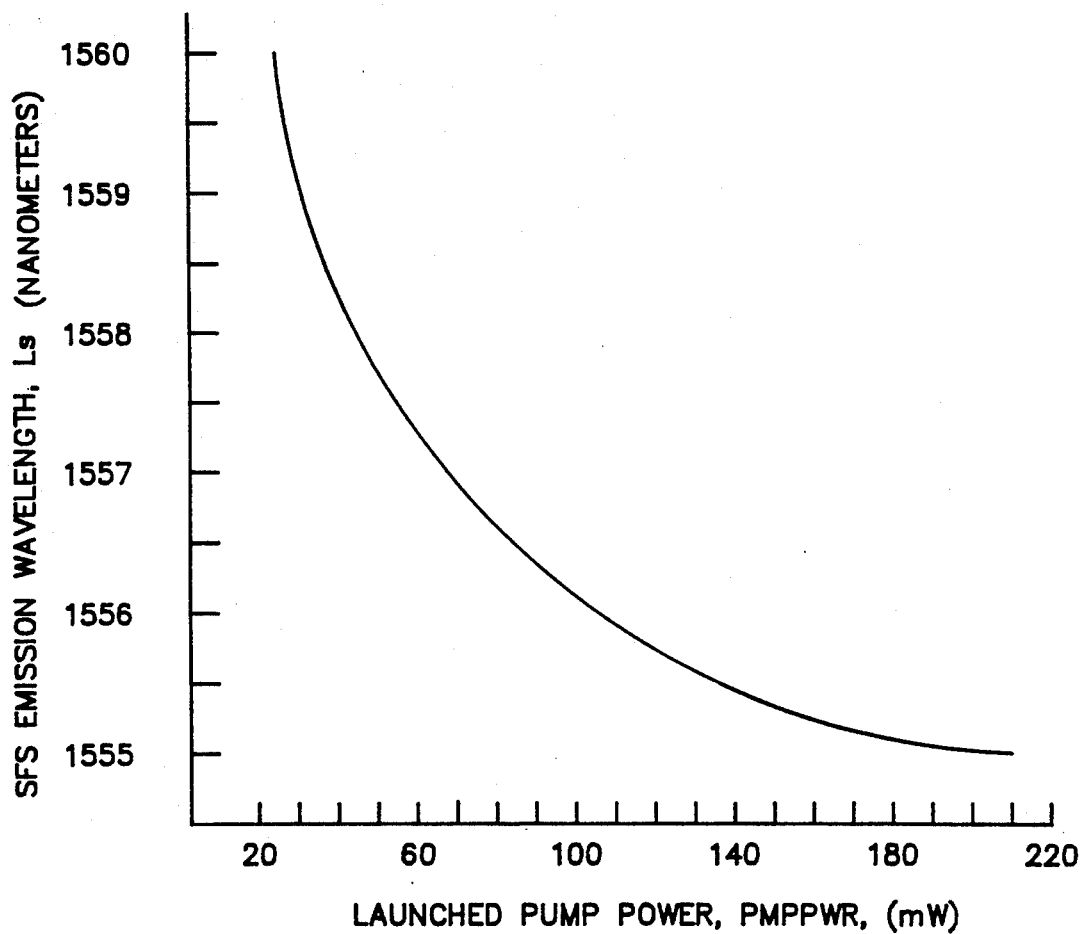
FIG. 4b is a graphical schematic representation that shows that the SFS fiber emission wavelength Ls of the SFS emission ray 32 varies as a function of the pump light ray 16 pump light power PMPPWR.

FIG. 4b is a graphical schematic representation of data that shows that the SFS fiber emission wavelength Ls of the SFS emission ray 32 varies as a function of the pump light power PMPPWR of the pump light ray 16. By way of example, the power level of this ray is typically in the order of 30 Mw. A pump power stability of about 1% is required to achieve an SFS emission wavelength stability of approximately 30 ppm.

Figure 5:
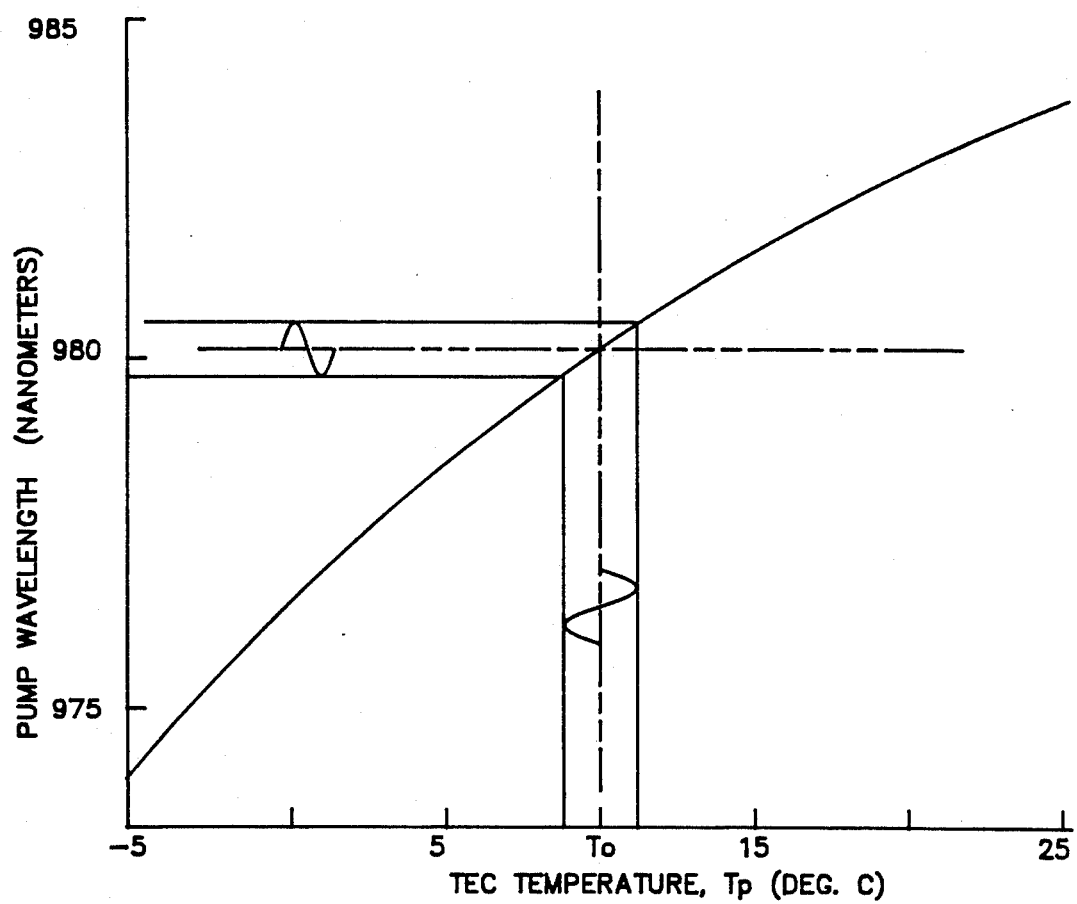
FIG. 5 is a graphical schematic representation of the pump wavelength as a function of temperature.

FIG. 5 is a graphical schematic representation that shows that the pump wavelength PMPLNTH varies as a function of pump temperature. The wavelength PMPLNTH of the pump light ray 16 is controlled by a means for controlling the pump source temperature such as the thermoelectric cooler (TEC) 56. FIG. 5 also shows that as the TEC 56 temperature is modulated over a controlled range, the pump wavelength varies accordingly.

Figure 6:
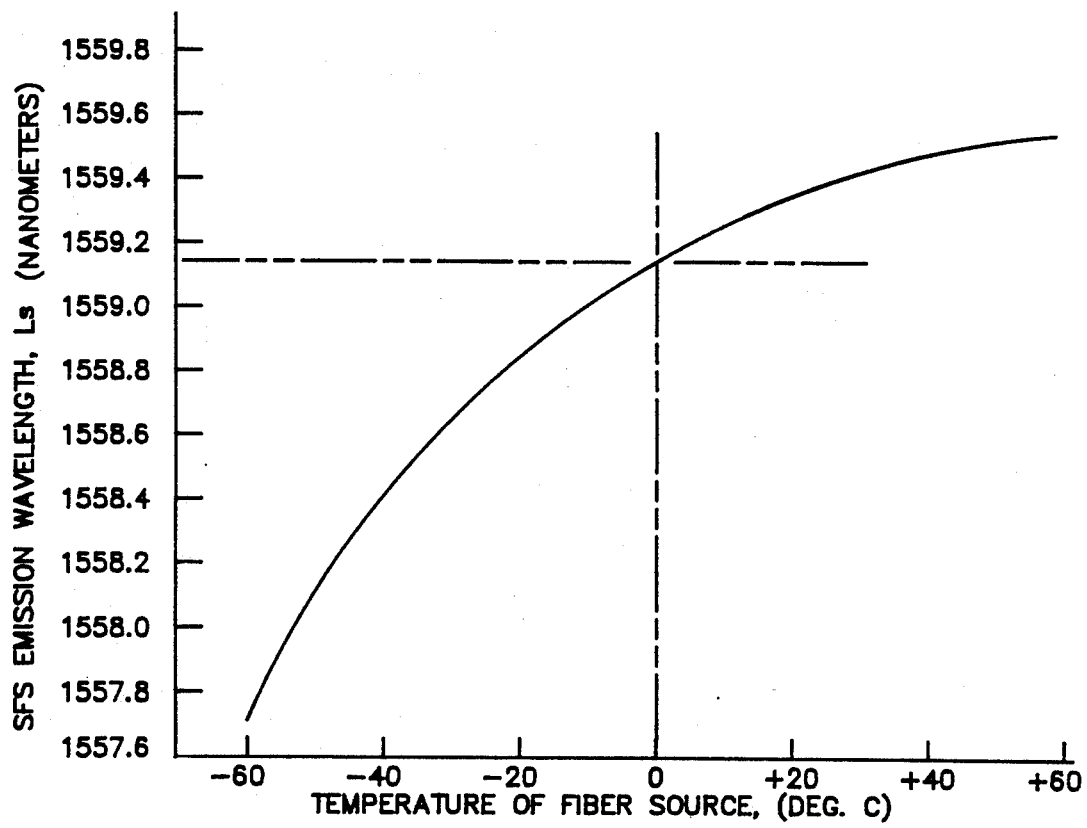
FIG. 6 is a graphical schematic representation of the SFS emission wavelength Ls as a function of the temperature of the SFS fiber source.

FIG. 6 graphical depicts in schematic fashion that the SFS emission wavelength Ls varies also as a function of the temperature of the SFS fiber source. Since the pump light source 14 is typically a diode with a dissipation that is dependent on its forward voltage drop and the drive current passing through it, and since there is no mechanism or process present to link the temperature of the SFS fiber source 12 to that of the pump light source 14, contributions to a change in the wavelength of the SFS source 12 due to changes to the temperature of the pump light source 14 which changes PMPLNTH and changes to the SFS source wavelength Ls from changes in the temperature of the SFS fiber source 12 are substantially independent of each other.

Equation 1, below, shows that the variation of the SFS emission ray wavelength Dls is a function of the partial derivative of Ls with respect to pump power PMPPWR times an incremental change in pump power DPMPPWR, plus the partial derivative of Ls with respect to pump wavelength PMPLNTH times an incremental change in pump wavelength DPMPLNTH, plus the partial derivative of Ls with respect to the temperature of the SFS source fiber Ts times and incremental change in the temperature of the source fiber Dts.

A net decrease in the maximum absolute value of Dls term at the left of the equation implies an increase in the stability of the SFS emission ray wavelength Ls. It is clear that the stability of the SFS emission ray wavelength Ls is greatest when the term Dls goes to zero. The Dls term is zero when the three terms on the right side of Equation 1 sum to zero.

$$Dls = (Dls/DPMPPWR)*DPMPPWR + \\ (Dls/DPMPLNTH)*DPMPLNTH + (DLs/Dts)*Dts$$

Equation 1.

Figure 7:
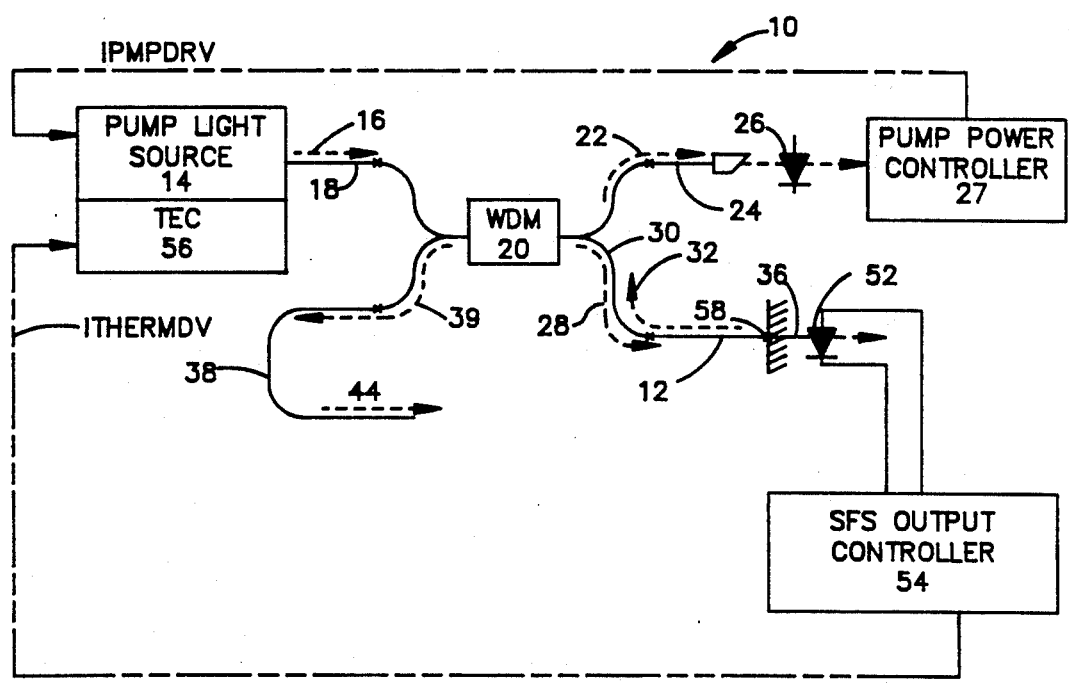
FIG. 7 is a block diagram of an alternate embodiment of the control system for stabilizing the wavelength of a broadband super fluorescent light source (SFS)

FIG. 7 shows a mechanization of an alternative preferred embodiment in which the third term in Equation 1 relating to the temperature of the SFS fiber source 12 is modeled out. FIG. 1 shows a preferred embodiment in which the third term of Equation 1 is evaluated. Referring to FIG. 1, SFS thermistor 59 senses the temperature of the SFS fiber source and provides an SFS temperature signal to a signal conditioner 60 within a using system within phantom block 62.

Signal conditioner 60 converts the SFS temperature signal into a series of sampled digital values that are coupled via bus 61 to signal processor 64 for use in correcting factors sensitive to the wavelength of the SFS output signal via ray 44 from output port 46 of coupler 42.

Using system 62, is typically an instrument such as an interferometer, fiber optic gyro, or triax fiber optic gyro that receives and uses the stabilized output light ray 44 at a receiving coupler 66 or other internal optics arrangement or instrument. The receiving coupler is used to output at least a first portion of the output signal 44 to at least a first internal instrument or system detector 68 using system 62.

The output of each system detector 68 couples the signal to a conditioner 70. After amplification and conditioning by conditioner 70, the conditioned signal from conditioner 70 is also provided to the signal processor 64 where the compensating effects from the SFS temperature signal are used to compensate for variation in the system signal from conditioner 70 that are due to the influence of temperature effects on the SFS source.

Referring to FIG. 6, as the temperature of the SFS source 12 varies, the signal processor 64 refers to a relationship, such as the relationship of FIG. 6, and the measured value of the temperature of the SFS fiber source 12 for a particular fiber and calculates the compensation required to cancel the effect of the third term in Equation 1.

In another alternate embodiment of the invention, such as that shown in FIG. 13, the SFS fiber source 12 is placed on a temperature controller such as SFS TEC 72. The SFS thermistor 59 senses the temperature and provides the SFS temperature signal to an SFS fiber temperature controller represented by phantom block 74 for controlling the temperature of the SFS fiber source 12.

In the alternative embodiment of FIG. 13, the SFS fiber temperature control means responds to the SFS temperature signal and to a predetermined temperature reference signal $T_s$ for stabilizing the temperature of the SFS fiber 12 to a value corresponding to the predetermined temperature reference signal $T_s$.

It is apparent from the block diagrams of FIGS. 1 and 6 that by sensing the temperature of the SFS fiber source 12, and by using temperature control process for the SFS fiber source 12 such as that described above in connection with FIG. 13, it would be feasible to further stabilize the superfluorescent source by turning the third term in Equation 1 substantially to a constant bias term.

In each of the above alternative embodiments, the associated wavelength error in the SFS system output signal 44 is optionally compensated by the subsequent using system 62 by software corrections made by the system signal processor 64.

The control process that remains requires that the value of the first and second terms be as small as possible, or of equal magnitude and opposite sign. In the embodiment of FIG. 1, the pump monitor detector 26 provides a signal representative of the amplitude of the first portion of the pump power Ppl to the pump power controller 27.

The pump power controller 27 represents a means responsive to the pump power signal from pump monitor detector 26 for regulating the value of IPMPDRV to fix the output power of the light from the pump light source 14 to a predetermined value. Thus, the first term in Equation 1 above is close to zero since (DPMPPWR$\simeq$ 0) by operation of the controller.

FIG. 12 shows an embodiment of the pump power controller 27 in which detector 26 senses light ray 22 which is proportional to the output power of the pump light source light applied to the SFS source 12. The signal from detector 22 is amplified and conditioned by amplifier KA. The output of the amplifier KA is low pass filtered by filter HI2(S). The filtered output is fed to the adder and summed with predetermined signal ISET representing the desired current in the pump power source. The output of the adder is integrated by GI(S) and the integrated output is fed back via HI1(S) to the adder. The output of the integrator is used to drive current to the pump power source.

FIG. 13 shows an embodiment of the SFS fiber temperature controller in which thermistor T1 senses the temperature of the SFS fiber 12. The SFS temperature signal from the thermistor T1 is conditioned by amplifier KB and is proportional to the temperature of the SFS fiber source 12. The SFS temperature signal is low pass filtered by filter HF2(S). The filtered output is fed to the adder and summed with predetermined signal Ts representing the desired temperature of the SFS fiber source 12. The output of the adder is integrated by GF(S) and the integrated output is fed back via HF1(S) to the adder. The output of the integrator is used to drive the TEC 72 to control the temperature of the SFS fiber source 12.

With reference again to FIG. 1, the invention is best characterized as a wavelength stabilization apparatus for a superfluorescent source 10. A SFS fiber source 12 represents an SFS (superfluorescent source) means for producing SFS light having an SFS wavelength when pumped with pump light from a pump light source 14 having a pump light wavelength, typically in range of 978 to 983 nano meters. In a simple form, the invention has an output controller means represented by output controller block 54 that is responsive to a sample of the SFS light at ray 47 for maximizing the power of said sample of SFS light by automatically adjusting said pump light wavelength. By maximizing the power of ray 47, the output controller means maximizes the stability of the SFS fiber source output.

The performance of the stabilization apparatus for the invention superfluorescent source improves by adding a pump power controller means represented by block 27 to the output controller means to a sample of the pump light from said pump light source via ray 22 exiting fiber pump monitor fiber port 25 for stabilizing the output power of the sample of said pump light with respect to a predetermined reference output power level.

In each of the preferred embodiments, of the wavelength stabilization apparatus for the superfluorescent source, the SFS fiber source contains a single mode optical fiber having a core doped with at least one active laser material selected from the group of rare earth materials such as neodymium or erbium or aluminum.

Referring again to the embodiment of FIG. 1 and FIG. 7, the SFS output controller 54 can be viewed as representing an output controller means having a pump light source temperature control means such as the TEC (thermal electric cooler) block 56 that is responsive to a thermal drive signal such as ITHERMDV for controlling the temperature of the pump light source 14, and an output sense and control means represented by block 54 for sensing the power of the sample of said SFS light via SFS sense ray 47, or residual ray 36, and for dithering the thermal drive signal by superimposing a small oscillatory signal on ITHERMDV to slightly vary the temperature of the pump light source around an operating temperature. A variation in pump light source temperature results in a corresponding variation in pump light source wavelength in pump light ray 16.

Figure 8A:
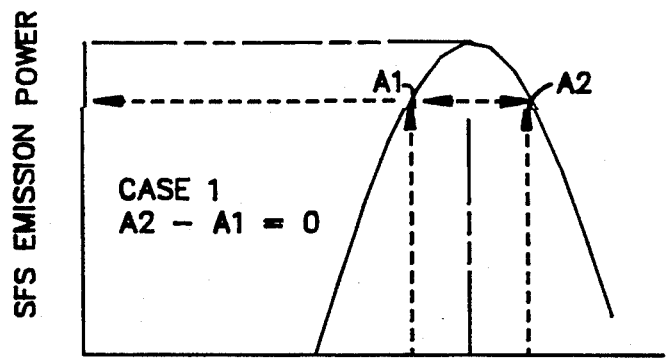
FIGS. 8a, 8b and 8c are graphical schematic representations showing the values of SFS fiber emission power that result at the extremes of a fixed variation in the temperature of the pump in response to variations in the TEC temperature.
Figure 8B:
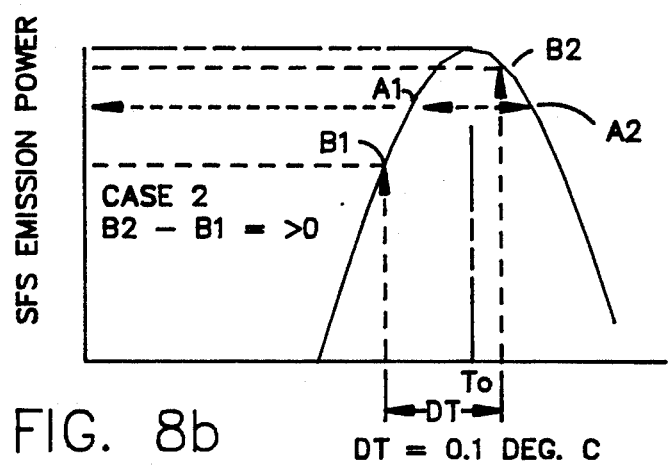
Figure 8C:
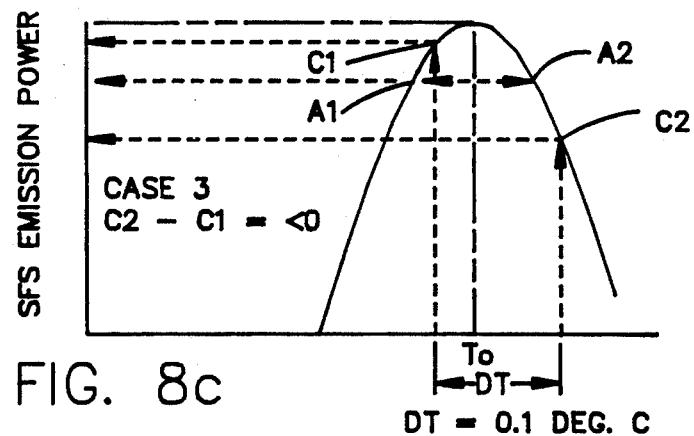

The SFS fiber source 12 responds to the variation in pump light source wavelength and provides a corresponding variation in the power of the SFS sense ray 47 sample of the SFS light. FIGS. 8a through 8c show how the SFS emission power varies in response to a variation in the temperature of the pump light source 14 at three different temperatures in synchronization with the reference signal waveform from the OSC1 oscillator in FIG. 9. The OSC 1 reference oscillator 112 is shown and discussed in connection with in FIGS. 10 and 11.

FIG. 8a shows the condition of the dither range DT on the independent variable axis centered at the desired temperature To.

FIG. 8b illustrates the condition of the dither range DT on the independent variable axis being displaced to an operating range centered at a temperature below the desired temperature To. The difference between the amplitude of the SFS emission power at the high temperature limit B2 of the dither range minus the value of the emission power at the low limit of the temperature range B1 results in a positive value. Alternatively, FIG. 8c shows that the difference between the amplitude of the SFS emission power at the high temperature limit C2 of the dither range minus the value of the emission power at the low temperature limit of the temperature range C1 results in a negative value. The SFS output controller of FIG. 1 responds to the variation in the power of the sample of the SFS light at SFS sense ray 47 by adjusting the thermal drive signal ITHERMDV to adjust the operating temperature of the pump light source 14 to maximize the power of the sample SFS sense ray, i.e. the output sense signal at sense ray 47.

The stability of the wavelength stabilization apparatus is increased by combining the use of a pump power controller means, discussed above in connection with block 27 in combination with a pump light source temperature control means, such as TEC 56. TEC 56 responds to a thermal drive signal to control the temperature of the pump light source 14. An output sense and control means, such as SFS output controller 54 discussed above, senses the power of the sample of the SFS light with SFS output detector diode 52 as it is illuminated starting with rays 39, via WDM 20 to fiber 38, to input 40 at output coupler 42, then via fiber 50 as SFS sense ray 47 incident on diode 52.

Diode 52 is a conventional detector diode and may be hermetically mounted in a metal can containing a preamp and an input lens through which sense ray 46 is allowed to pass. Detector diodes are sometimes PIN diodes. In the alternative, diode 52 is contained within the SFS output controller 54. For this arrangement, sense ray 47 is extended to include ray 55 entering the SFS output controller 54 to be incident on a detector (not shown).

Figure 9:
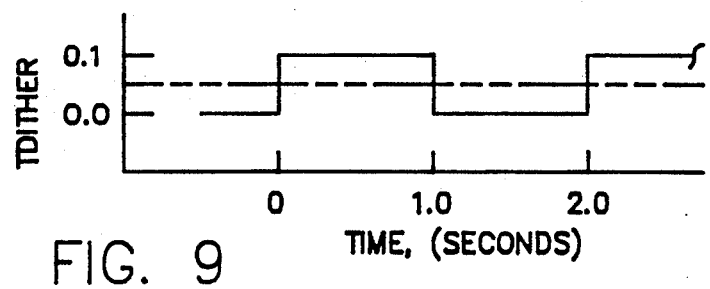
FIG. 9 is a graphical schematic representation of the TDITHER drive voltage from the reference oscillator as a function of time.
Figure 10:
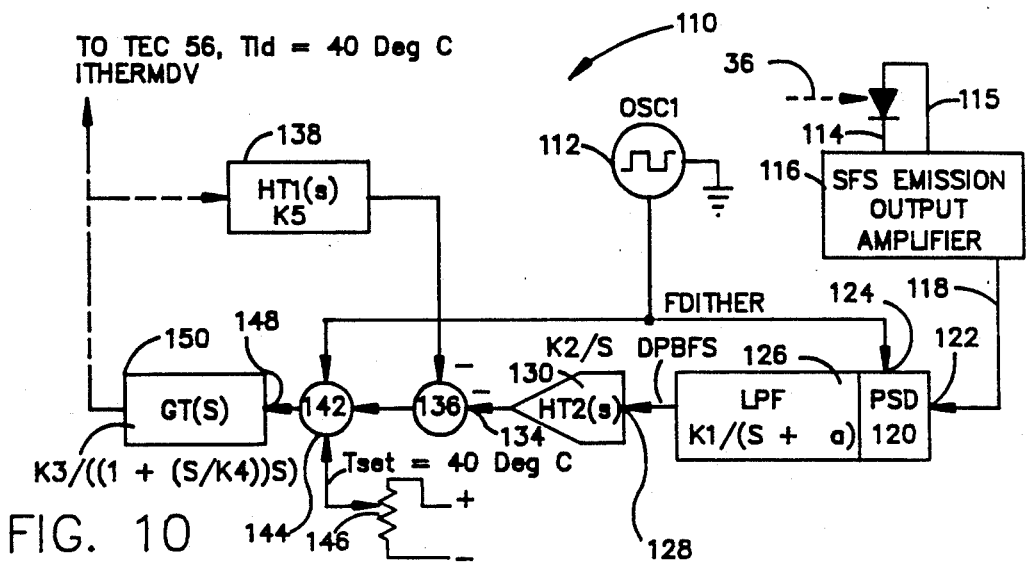
FIG. 10 is a block diagram of an embodiment of the output controller for the control system for stabilizing the wavelength of a broadband super fluorescent light source (SFS)

FIG. 10 shows an embodiment of an SFS output controller 54 or output sense and control process or circuit for receiving the sensed signal, as in FIG. 7, via ray 36 via signal lines 114, 115. Block 116 represents an SFS emission output amplifier having a voltage gain typically in the range of 20 to 100. The amplified sense signal is coupled from amplifier output 118 to the input of a PSD (phase sensitive demodulator) 120 at a first input 122. The PSD is referenced to the output of OSC1 by signal FDITHER at second input 124. FIG. 9 shows a typical waveform for OSC1.

The demodulated output of the PSD 120 is fed to the LPF (low-pass filter) 126. The filtered sense signal is fed to integrator input 128 for integration by integrator HT2(S), 130. The demodulated, filtered, integrated sense signal is coupled to a first subtracting input 134 of adder 136 for subtraction from feedback signal from ITHERMDV via feedback element 138.

The output of adder 136 is coupled to the first input 140 of second adder 142. A predetermined temperature reference signal at second adder input 144 from potentiometer 146 is added with the FDITHER signal from OSI 112 to form a combined signal or the feedback corrected demodulated, filtered, integrated sense signal at the input 188 of the GT(S) block 150. The GT(S) block 150 block filters and integrates the combined signal to form the ITHERMDV drive signal to the TEC 56. Note that the FDITHER signal is imposed on the input of the GT(S) control block 150 at a point that insures that the output of the GT(S) block will contain the dither signal desired.

Figure 11:
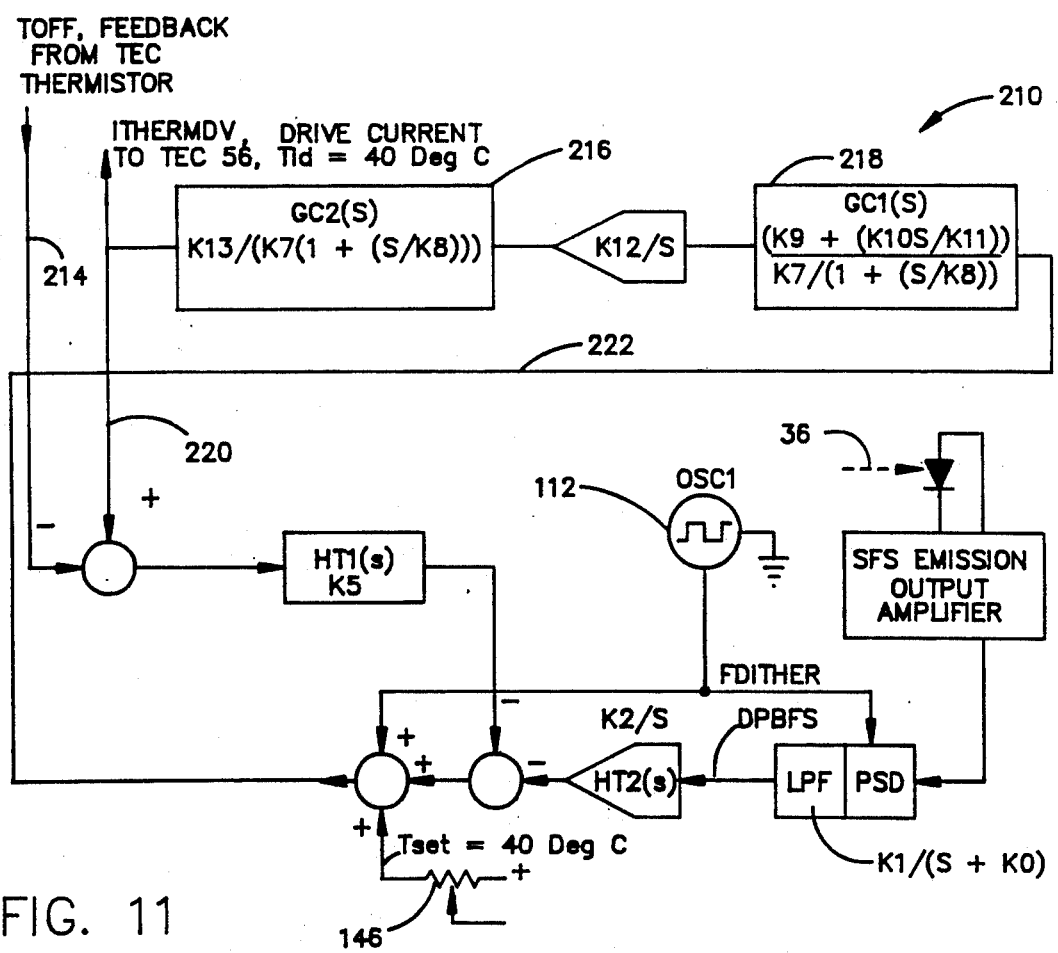

The control process 210 of FIG. 11 contains many elements identical to those in the control process of FIG. 10; but, also includes a provision for receiving a temperature feedback signal TOFF from the TEC thermistor on signal line 214. The control process of FIG. 11 also contains compensation block GC2(S) 216 and GC1(S) 218 with compensating poles and zeros introduced to accommodate the response characteristics of the TEC 56 when driven by ITHERMDV on signal line 220. The control process 210 provides a TEC thermal control in accordance with the control signal on signal line 222.

The apparatus of FIG. 1 provides a way to practice a method or process for the wavelength stabilization of a superfluorescent fiber source comprising the step of:

A. pumping a SFS (superfluorescent source) to produce SFS light having an SFS wavelength with pump light from a pump light source having a pump light wavelength;

B. sampling SFS light from the SFS and maximizing the power of the sample of SFS light by automatically adjusting the pump light wavelength; and C. repeating steps A and B.

The apparatus of FIG. 7 provides a way to practice the method for stabilizing a superfluorescent source comprising the steps of:

A. producing SFS light from an SFS source having an SFS wavelength by pumping the SFS source with pump light from a pump light source having a pump light wavelength, a first portion of said pump light being absorbed in pumping the SFS source and a second portion of said pump light exiting the SFS source as a residue pump ray; followed by step:

B. sensing the residue pump ray and responding to the residue pump ray to maximize the power of said sample of SFS light by automatically adjusting said pump light wavelength to minimize the power of the residue pump ray.

Accordingly there has been described a wavelength stabilization apparatus and method for a superfluorescent fiber source. Although the invention has been disclosed and illustrated in detail, it is to be understood that the same is by way of illustration and example only and is not to be taken by way of limitation. The spirit and scope of this invention is to be limited only by the terms of the appended claims.

I claim:

1. A wavelength stabilization apparatus for a superfluorescent fiber source comprising:
   a SFS (superfluorescent source) means for producing SFS light having an SFS wavelength when pumped with pump light from a pump light source having a pump light wavelength;
   an output controller means responsive to a sample of SFS light for maximizing the power of said sample of SFS light by automatically adjusting said pump light wavelength, said output controller means having;
   a pump power controller means responsive to a sample of the pump light from said pump light source for stabilizing the output power of the sample of said pump light with respect to a predetermined reference output power level.

2. The wavelength stabilization apparatus for the superfluorescent source of claim 1 wherein said SFS (superfluorescent source) means further comprises:
   an SFS fiber source containing a single mode optical fiber having a core doped with at least one active laser material selected from the group of rare earth materials comprising neodymium or erbium.

3. The wavelength stabilization apparatus for the superfluorescent source of claim 1 wherein said output controller means further comprising:
   a pump light source temperature control means responsive to a thermal drive signal for controlling the temperature of the pump light source, and
   an output sense and control means for sensing the power of the sample of said SFS light and for dithering the thermal drive signal to slightly vary the temperature of the pump light source around an operating temperature, the variation in pump light source temperature resulting in a corresponding variation in pump light source wavelength, said SFS fiber source being responsive to said variation in pump light source wavelength to provide a corresponding variation in the power of the sample of the SFS light, the output sense and control means being responsive to the variation in the power of the sample of the SFS light for adjusting the thermal drive signal to adjust the operating temperature of the pump light source to maximize the power of the sample SFS light.

4. The wavelength stabilization apparatus for the superfluorescent source of claim 3 wherein said pump light source temperature control means further comprises:
   a thermoelectric cooler to which the pump light source is thermally coupled; and
   a thermistor for measuring the temperature of the pump light source and for providing a pump temperature signal corresponding to the temperature of the pump light source; said
   output sense and control means being further characterized to be responsive to the pump temperature signal for adjusting the thermal drive signal to adjust the operating temperature of the pump light source to maximize the power of the sample SFS light.

5. The wavelength stabilization apparatus for the superfluorescent source of claim 1 wherein said SFS (superfluorescent source) means further comprises an SFS fiber source, and said output controller means further comprising:
   a temperature control means responsive to a an SFS temperature control signal for controlling the temperature of the SFS fiber source to correspond with a predetermined fixed value; and
   a temperature control measuring means coupled to the SFS fiber source for providing said SFS temperature signal.

6. A wavelength stabilization apparatus for a superfluorescent source comprising:
   a SFS (superfluorescent source) means for producing SFS light having an SFS wavelength when pumped with pump light from a pump light source having a pump light wavelength, a first portion of said pump light being absorbed in pumping the SFS means and a second portion of said pump light exiting said SFS means as a residual pump ray;
   an output controller means responsive to the residual pump ray for maximizing the power of said sample of SFS light by automatically adjusting said pump light wavelength, said output controller means having;
   a pump power controller means responsive to a sample of the pump light from said pump light source for stabilizing the output power of the sample of said pump light with respect to a predetermined reference output power level.

7. The wavelength stabilization apparatus for the superfluorescent source of claim 6 wherein said output controller means further comprising:
   a pump light source temperature control means responsive to a thermal drive signal for controlling the temperature of the pump light source, and
   an output residue sense and control means for sensing the power of the residual pump ray and for dithering the thermal drive signal to slightly vary the temperature of the pump light source around an operating temperature, the variation in pump light source temperature resulting in a corresponding variation in pump light source wavelength, said SFS means being responsive to said variation in pump light source wavelength to provide a corresponding variation in pump light source light absorption, the power of the residue ray varying as an inverse function to the power of the SFS light output, the output residue sense and control means being responsive to the variation in power of the residue pump ray for adjusting the thermal drive signal to adjust the operating temperature of the pump light source to minimize the power of the residue pump ray.

8. The wavelength stabilization apparatus for the superfluorescent source of claim 7 wherein said pump light source temperature control means responsive to a thermal drive signal for controlling the temperature of the pump light source further comprises:
   a thermoelectric cooler to which the pump light source is thermally coupled; and,
   a thermistor for measuring the temperature of the pump light source and for providing a pump temperature signal corresponding to the temperature of the pump light source;
   said output sense and control means being further characterized to be responsive to the pump temperature signal for adjusting the thermal drive signal to adjust the operating temperature of the pump light source to maximize the power of the sample SFS light.

9. The wavelength stabilization apparatus for the superfluorescent source of claim 6 wherein said SFS means further comprises:
   an SFS fiber source; and
   a dichroic mirror for passing light at the pump wavelength and for reflecting light at the SFS fiber source wavelength into the SFS fiber source; and
   wherein said output controller means further comprises:
   an output residue sense and control means for sensing the power of the residual pump ray exiting the dichroic mirror for dithering the thermal drive signal to slightly vary the temperature of the pump light source around an operating temperature, the variation in pump light source temperature resulting in a corresponding variation in pump light source wavelength, said SFS means being responsive to said variation in pump light source wavelength to provide a corresponding variation in pump light source light absorption, the power of the residue ray varying as an inverse function to the power of the SFS light output, the output residue sense and control means being responsive to the variation in power of the residue pump ray for adjusting the thermal drive signal to adjust the operating temperature of the pump light source to minimize the power of the residue pump ray.

10. The wavelength stabilization apparatus for the superfluorescent source of claim 6 wherein said SFS means further comprises:
    an SFS fiber source; and wherein
    said output controller means further comprises:
    a temperature control means responsive to a an SFS temperature control signal for controlling the temperature of the SFS fiber source to correspond with a predetermined fixed value; and,
    a temperature control measuring means coupled to the SFS fiber source for providing said SFS temperature signal.

11. A wavelength stabilization method for stabilizing a superfluorescent source comprising the step of:
    pumping a SFS (superfluorescent source) to produce SFS light having an SFS wavelength with pump light from a pump light source having a pump light wavelength;
    sampling SFS light from the SFS and
    maximizing the power of the sample of SFS light by automatically adjusting the pump light wavelength.

12. A wavelength stabilization method for an SFS (superfluorescent source) source comprising the steps of:
    producing SFS light from an SFS source having an SFS wavelength by pumping the SFS source with pump light from a pump light source having a pump light wavelength, a first portion of said pump light being absorbed in pumping the SFS source and a second portion of said pump light exiting the SFS source as a residue pump ray;
    sensing the residue pump ray; and
    responding to the residue pump ray to maximize the power of said sample of SFS light by automatically adjusting said pump light wavelength minimize the power of the residue pump ray.

13. A wavelength stabilization apparatus for a superfluorescent fiber source comprising:
    a SFS (superfluorescent source) means for producing SFS light having an SFS wavelength when pumped with pump light from a pump light source having a pump light wavelength;
    an output controller means responsive to a sample of SFS light for maximizing the power of said sample of SFS light by automatically adjusting said pump light wavelength, said output controller means having;
    a pump light source temperature control means responsive to a thermal drive signal for controlling the temperature of the pump light source, and
    an output sense and control means for sensing the power of the sample of said SFS light and for controlling the thermal drive signal to vary the temperature of the pump light source around an operating temperature,
    the variation in pump light source temperature resulting in a corresponding variation in pump light source wavelength,
    said SFS fiber source being responsive to the variation in pump light source wavelength to provide a corresponding variation in the power of the sample of the SFS light,
    the output sense and control means being responsive to the variation in the power of the sample of the SFS light for adjusting the thermal drive signal to adjust the operating temperature of the pump light source to maximize the power of the sample SFS light.

14. The wavelength stabilization apparatus for the superfluorescent source of claim 13 wherein said SFS (superfluorescent source) means further comprises an SFS fiber source, and said
    output controller means further comprising:
    a temperature control means responsive to a an SFS temperature control signal for controlling the temperature of the SFS fiber source to correspond with a predetermined fixed value; and
    a temperature control measuring means coupled to the SFS fiber source for providing said SFS temperature signal.

15. The wavelength stabilization apparatus for the superfluorescent source of claim 13 wherein said pump light source temperature control means further comprises:
    a thermoelectric cooler to which the pump light source is thermally coupled; and,
    a thermistor for measuring the temperature of the pump light source and for providing a pump temperature signal corresponding to the temperature of the pump light source; said output sense and control means being further characterized to be responsive to the pump temperature signal for adjusting the thermal drive signal to adjust the operating temperature of the pump light source to maximize the power of the sample SFS light.

16. A wavelength stabilization apparatus for a superfluorescent source comprising:
    a SFS (superfluorescent source) means for producing SFS light having an SFS wavelength when pumped with pump light from a pump light source having a pump light wavelength, a first portion of said pump light being absorbed in pumping the SFS means and a second portion of said pump light exiting said SFS means as a residual pump ray;

an output controller means responsive to the residual pump ray for maximizing the power of said sample of SFS light by automatically adjusting said pump light wavelength, said output controller means having;

a pump light source temperature control means responsive to a thermal drive signal for controlling the temperature of the pump light source, and an output residue sense and control means for sensing the power of the residual pump ray and for adjusting the thermal drive signal to adjust the operating temperature of the pump light source to minimize the power of the residue pump ray.

17. The wavelength stabilization apparatus of claim 16 wherein:

the output residue sense and control means is further characterized to vary the thermal drive signal to provide a variation in pump light source temperature around an operating point, the variation in temperature resulting in a corresponding variation in pump light source wavelength, and wherein;

said SFS means responds to the variation in pump light source wavelength to provide a corresponding variation in pump light source light absorption, the power of the residue ray varying as an inverse function to the power of the SFS light output; whereby, the output residue sense and control means responds to the variation in power of the residue pump ray by adjusting the thermal drive signal to adjust the operating temperature of the pump light source to minimize the power of the residue pump ray.

18. The wavelength stabilization apparatus of claim 16 wherein the SFS means further comprises:

an SFS fiber source; and a dichroic mirror for passing light at the pump wavelength and for reflecting light at the SFS fiber source wavelength into the SFS fiber source; and wherein said output controller means further comprises:

an output residue sense and control means for sensing the power of the residual pump ray exiting the dichroic mirror and for dithering the thermal drive signal to slightly vary the temperature of the pump light source around an operating temperature, the variation in pump light source temperature resulting in a corresponding variation in pump light source wavelength, said SFS means being responsive to said variation in pump light source wavelength to provide a corresponding variation in pump light source light absorption, the power of the residue ray varying as an inverse function to the power of the SFS light output, the output residue sense and control means being responsive to the variation in power of the residue pump ray for adjusting the thermal drive signal to adjust the operating temperature of the pump light source to minimize the power of the residue pump ray.

* * * * *